Jan. 9, 1934.                C. E. JOHNSON                1,942,649
                      LINE START INDUCTION MOTOR
                   Filed Aug. 18, 1930        3 Sheets-Sheet 1
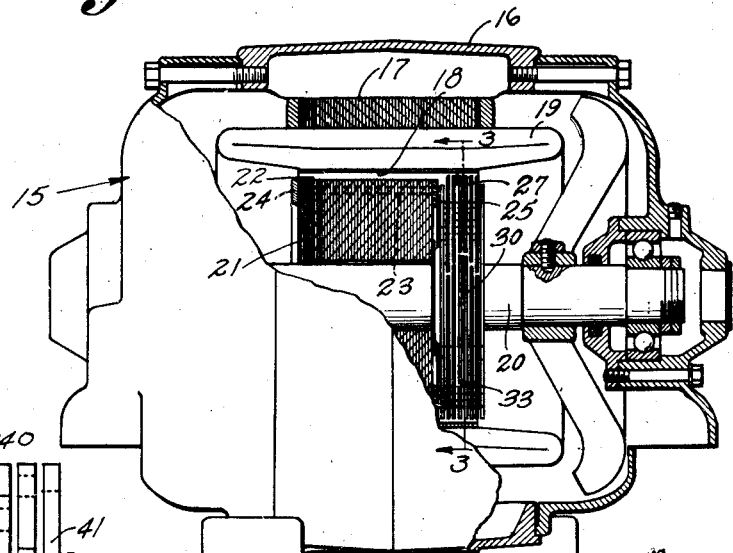
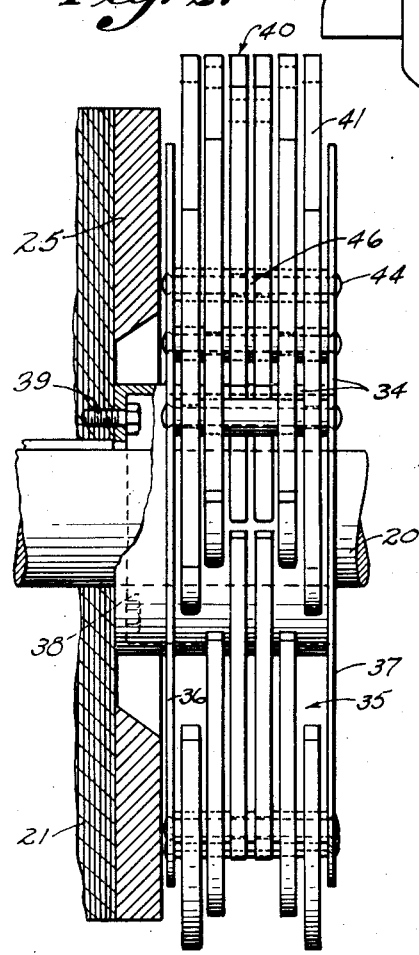
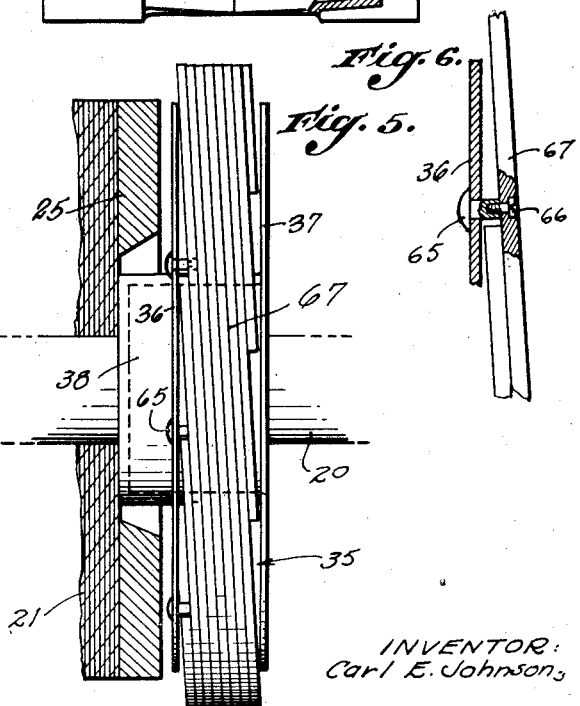
INVENTOR:
Carl E. Johnson
BY
Ford W. Harris
ATTORNEY.

Jan. 9, 1934.  C. E. JOHNSON  1,942,649
LINE START INDUCTION MOTOR
Filed Aug. 18, 1930   3 Sheets-Sheet 2

INVENTOR:
Carl E. Johnson,
BY
ATTORNEY.

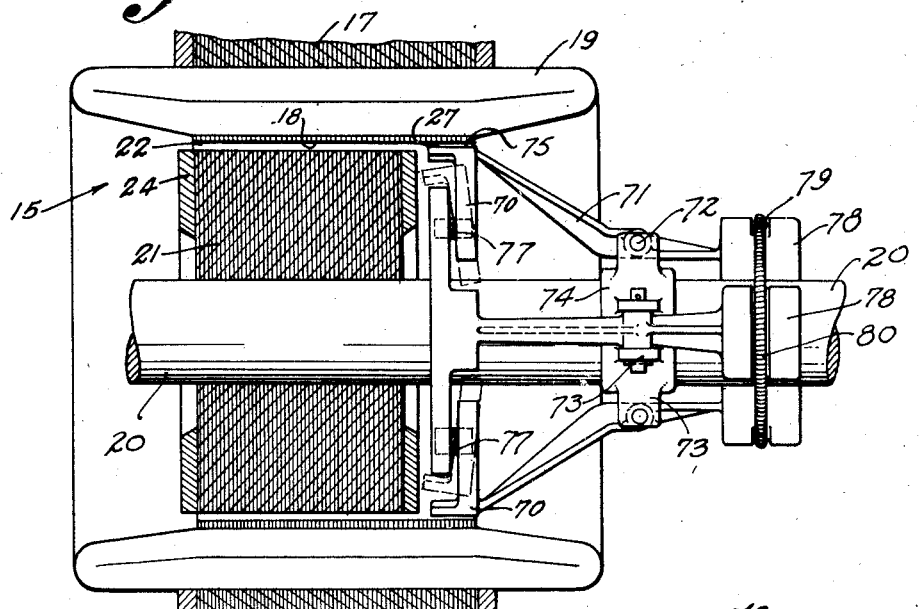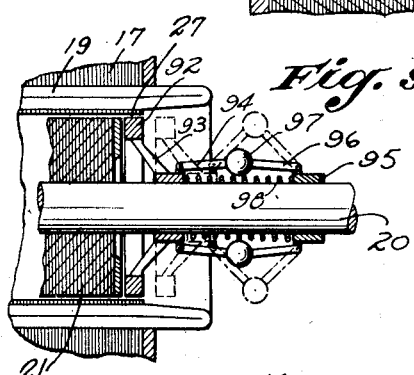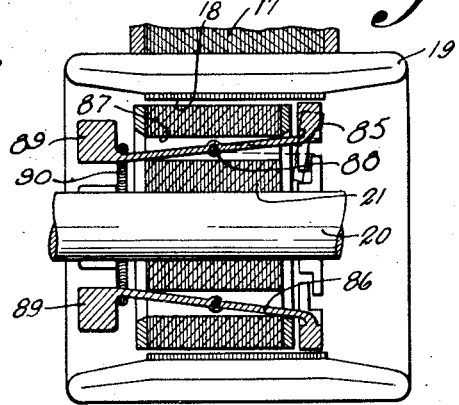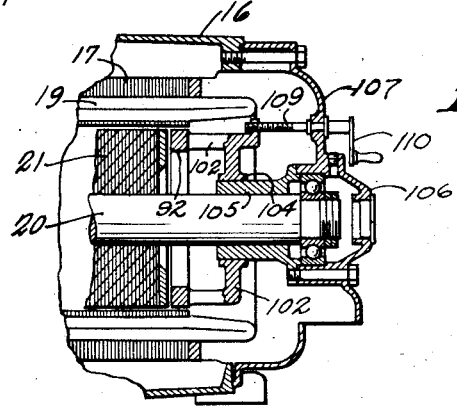

Patented Jan. 9, 1934

1,942,649

UNITED STATES PATENT OFFICE 1,942,649

LINE-START INDUCTION MOTOR

Carl E. Johnson, Pasadena, Calif., assignor to Sterling Electric Motors, Inc., Los Angeles, Calif., a corporation of California Application August 18, 1930. Serial No. 475,986

10 Claims. (Cl. 172—120)

My invention relates to dynamo-electric machines, and more particularly to an attachment for an induction motor whereby certain speed variation is made possible, and whereby starting current is limited. While I shall particularly describe the invention in combination with an induction motor, it should be understood that I am not in all cases limited thereto, my invention finding utility in other electrical apparatus.

The conventional induction motor provides a stator including a winding, the energization of this winding sending flux through the air gap and through the magnetic body of the rotor in a manner to set up currents in the rotor which cause a rotation thereof. The current through the stator winding is quite large during starting and various expedients have been devised for limiting this current. One method is to use a suitable starting resistance or reactance in series with the stator winding and gradually remove this from the motor circuit as the speed of the rotor increases.

It is an object of the present invention to provide a novel method of limiting starting current in a dynamo-electric machine.

This I accomplish by short-circuiting a portion of the magnetic flux produced by the stator winding and which would otherwise pass through the rotor, and it is an object of this invention to provide a novel structure whereby a variable amount of flux formed by a winding in one of a pair of magnetic members is short-circuited, this portion of the flux otherwise passing through the other of these members.

A further object of the invention is to provide a novel ring structure movable toward and away from the stator of a motor in a manner to short-circuit variable amounts of flux produced by a winding thereon.

Still a further object of the invention is to provide a ring structure formed of segments so as to be collapsible to accomplish this movement toward and away from the stator.

The combination of a short-circuiting member movable relative to the stator may be used not only for limiting the starting current, but also for controlling the speed of the rotor. In the former system, the member is preferably moved automatically as a function of the speed of the rotor, but in the latter system the movement of this short-circuiting member is preferably accomplished by manual means, and it is an object of this invention to provide operating devices for accomplishing such movements of a short-circuiting member.

A further object of the invention is to provide a novel method of controlling the speed of an induction motor by short-circuiting variable amounts of the flux which would otherwise pass through the rotor.

Still further objects and advantages of my invention will be made evident hereinafter.

Referring to the drawings:

Fig. 1 is an elevational view, partially in section, of one form of motor included in my invention.

Fig. 2 is an enlarged elevational view of the ring structure of Fig. 1.

Fig. 5 is an elevational view of an alternative form of collapsible ring structure.

Fig. 6 is a diagrammatic view illustrating a method of attachment of the segments illustrated in Fig. 5.

Fig. 7 is an alternative form of collapsible ring structure.

Fig. 8 is still another alternative form of ring structure.

Fig. 9 is an alternative form illustrating a non-collapsible ring structure with centrifugal operating means.

Fig. 10 is an alternative form illustrating such a non-collapsible ring structure which may be manually moved.

Figure 3:
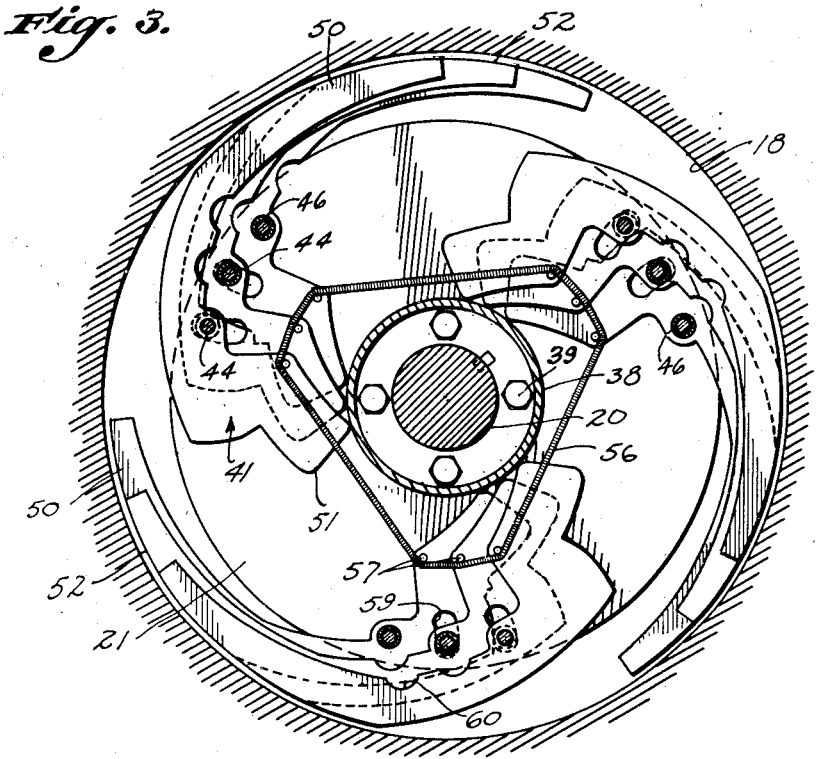
Figs. 3 and 4 are sectional views taken on the line 3—3 of Fig. 1, the former showing the ring structure in advanced position and the latter showing the structure in collapsed or retracted position.

Referring particularly to Fig. 1, I have illustrated a motor 15 including a frame 16 in which a stator 17 is mounted, this stator providing a rotor space defined by a cylindrical surface 18. The stator is made in the conventional manner and comprises a group of assembled laminations providing aligned slots adapted to receive a stator winding 19 which, when energized, sets up a rotating magnetic field in the rotor space. A shaft 20 is suitably journalled and extends through the rotor space, there being a rotor 21 keyed thereto. This rotor is preferably formed of a magnetic body comprising assembled laminations which are slightly smaller in diameter than the cylindrical surface 18 so as to provide the conventional air gap 22 therebetween. The rotor carries suitable conductor bars indicated by dotted lines 23 and joined together at their ends by end rings 24 and 25 in the usual manner. The rotor 21 is shorter than the stator 17 so as not to occupy a control space 27 inside the cylindrical surface 18 at one end of the stator.

Positioned in the control space 27 is a short-circuiting structure 30 formed of magnetic material and adapted to short-circuit a portion of the flux set up by the winding 19, which portion would otherwise pass through the rotor 21.

Figure 4:
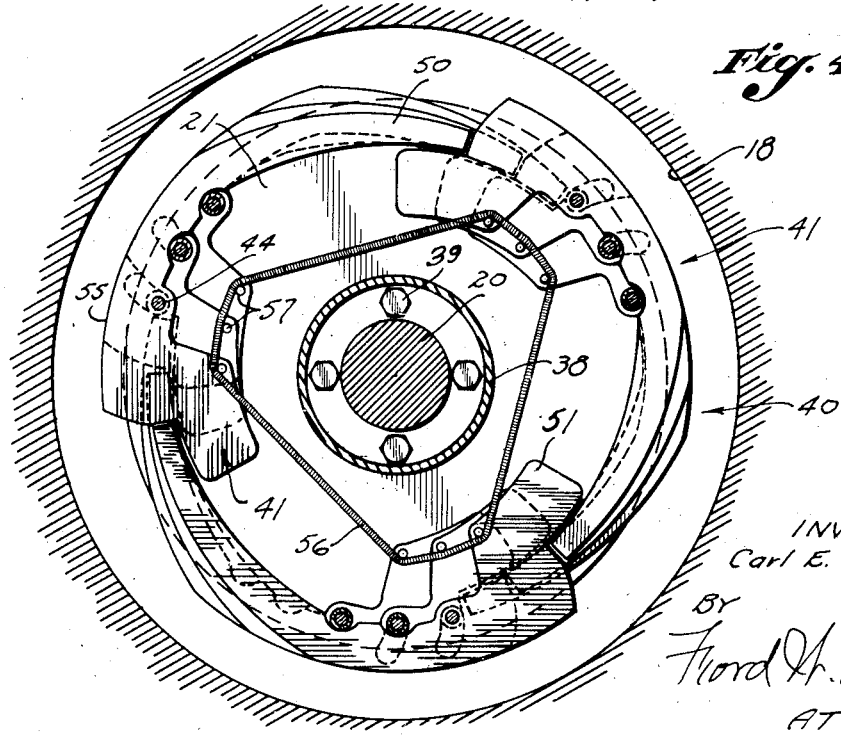

The form of short-circuiting structure 30 shown in Fig. 1 comprises a collapsible ring 33, the details of which are best shown in Figs. 2, 3, and 4. Referring particularly to these figures I have illustrated an annular frame 34 formed of U-shape cross-section so as to provide an annular channel 35 defined between side walls 36 and 37, this frame providing a flange 38 secured to the rotor 21 as by cap screws 39 so as to rotate therewith. The magnetic portion of this short-circuiting structure is in the form of a ring 40 formed of segments 41 which are pivoted on pins 44 extending across the channel 35 and secured to the side walls 36 and 37. In Fig. 2 I have illustrated three groups of these segments, there being six segments abreast in the channel 35, the three groups of segments being spaced around the periphery of the rotor. The combined thickness of these six segments is less than the distance between the side walls 36 and 37 in the embodiment shown in Fig. 2, so that the segments are maintained in spaced relationship relative to each other, this being accomplished by suitable spacers 46 surrounding the pins 44.

The shape of each segment 41 is best illustrated in Figs. 3 and 4, each segment providing an arm portion 50 and a weight portion 51, these segments being stamped from magnetic material. The arm portions 50 are so formed that when the segments 41 are in their extended position shown in Fig. 3, these arms will cooperate in forming an outer surface 52 which is only slightly smaller in diameter than the cylindrical surface 18, the distance between these surfaces being preferably less than the distance across the air gap 22. When the segments 41 are pivoted about their respective pins 44 so as to move into a retracted or collapsed position shown in Fig. 4, the arm portions 50 move inward and the weight portions 51 move outward, these weight portions then cooperating in defining an outer surface 55 which is materially smaller in diameter than the cylindrical surface 18.

The segments 41 are normally retained in the advanced position shown in Fig. 3, this being accomplished by any suitable means such as a tension spring 56 extending around pins 57 mounted in the weight portion of each segment 41 in a manner to normally hold the weight portions in the inner positions shown in Fig. 3, in which these portions engage the bottom wall of the annular channel 35. As the rotor comes up to speed, these portions are automatically thrown into the position shown in Fig. 4, this being accomplished by suitably designing the weight portions 51 so that the centrifugal force thereon overcomes the centrifugal force on the arm portions 50 and the action of the spring 56, thus pivoting the segments 41 into the positions shown in Fig. 4. It should be understood that each segment 41 operates independently of the other segments, aside from the action of the spring 56, and it is sometimes necessary to provide these segments with cut-away portions so that they do not interfere with the pins 44 and spacers 46 on which adjacent segments 41 are pivoted. In the form shown, such cut-away portions are illustrated by elongated openings 59 and by notches 60. In other designs it is possible to dispense with such cut-away portions.

In Figs. 2, 3, and 4, I have illustrated but three groups of these segments, this limited number being shown for the purpose of clearness. With such a grouping, the surfaces 52 and 55 are not continuous around the axis of the shaft, as they would be if more groups of segments were utilized, but the arm portions 50 are made sufficiently long so that they bridge at least two "poles" of the stator, the spacing of these poles being, of course, determined by the particular winding 19 utilized.

In Fig. 5, I have shown an alternative form of collapsible ring structure in which it is not necessary to use pins 44 extending completely across the channel 35. Instead, each section extends helically relative to the shaft, and is pivoted on a rivet 65 retained in the side wall 36, the end of this rivet being threaded to receive a screw 66 which is in turn countersunk into the segments 67 pivoted thereon. The segments 67 have arm portions and weight portions similar to those previously described, the former moving outward into close proximity with the cylinder surface 18 when the rotor is stationary and being drawn inward into retracted or collapsed position when the rotor comes up to speed, as previously described. The fundamental difference between the form shown in Figs. 1 to 4 and that shown in Fig. 5 lies in the method of pivoting the segments 67 so that these segments may lie adjacent or in contact with each other.

In Fig. 7, I have illustrated another form of collapsible ring structure, this being formed by lap-jointed segments 70 formed of magnetic material and secured to members 71, each of these members being pivoted on a pin 72 retained in ears 73 formed on a collar 74 rotating with the shaft 20. The details of these lap-jointed segments 70 are clearly shown in Fig. 7, each segment being provided with an outer arcuated surface 75 which is only slightly less in radius than the cylindrical surface 18 so that when the segments 70 are in their full-line or advanced position shown in Fig. 7 they lie closer to this cylindrical surface 18 than does the outer surface of the rotor 21. The ends of each segment 70 extend along and in spaced relationship from the ends of adjacent segments 70 when the segments are in the full-line position shown in Fig. 7, and if desired, it is possible to connect these segments by a flexible member 77 such as is indicated in Fig. 7, this member being formed by a suitable flexible magnetic structure connecting adjacent segments 70 so as to conduct flux from one to the other. In certain instances this flexible member is entirely unnecessary, and especially if the segments 70 extend over a peripheral distance which is greater than the distance between the "poles" of the stator. In other instances the segments may be formed to contact each other at all times.

Pivoting the members 71 about their respective pins 72 moves the segments 70 into positions shown by dotted lines in Fig. 7, wherein the surface 75 moves away from the cylindrical surface 18 of the stator. It is possible to accomplish this end either manually or automatically, but in Fig. 7 I have shown an automatic system wherein the members 71 carry weights 78 including grooves 79 in which a spring 80 is positioned. The weights are so designed that when the motor comes up to speed, the centrifugal force on these weights is greater than the corresponding centrifugal force on the segments 70, taking into account the difference in leverarm on opposite sides of the pin 72, thus causing the weights 78 to move outward and the segments 70 to move inward into their dotted line position.

Similarly, in Fig. 8 I have shown a lap-jointed ring structure formed of segments 85 similar to those shown in Fig. 7, each segment being provided with an arm 86 extending through a corresponding opening 87 formed through the magnetic body of the rotor, this arm being pivoted on a pin 88 extending across the opening 87. The free end of the arm carries a weight 89 and this free end is also normally drawn inward by a spring 90, this spring extending around adjacent arms of the corresponding segments 85. The weights 89 are so designed that they overcome the pressure of the spring 90 and move outward when the rotor comes up to speed, thus moving the segments 85 inward into a retracted position and away from the cylindrical surface 18 of the stator.

In Fig. 9, I have shown another automatic system for moving the ring structure toward and away from the stator. The ring structure in this event is a solid ring 92 formed of magnetic material and supported on arms 93 secured to a sleeve 94 which is axially slidable on the shaft 20 so that the ring 92 may move into and out of the control space 27, the two positions of this ring being shown by dotted and full lines in Fig. 9. The automatic withdrawal of the ring 92 from the control space 27 as the rotor comes up to speed is effected by a suitable governor means shown as including a sleeve 95 secured to the shaft, the sleeves 94 and 95 being connected by links 96 pivoted to a weight 97 which moves outward into its dotted line position when sufficient centrifugal force is exerted thereon. This outward movement of the weight acts against a compression spring 98 positioned in the sleeves 94 and 95 in the usual manner, this spring returning the ring 92 into its full-line position when the speed of rotation decreases.

In Fig. 10, I have shown a ring similar to the ring 92 previously described, this ring being mounted on arms 102 secured to a collar 104 sliding on a cylindrical surface of a stationary boss 105 which may be conveniently formed on a bearing structure 106 which forms a part of an end ring 107 secured to the frame 16. In this event the ring 92 is stationary and is moved toward and away from the stator through the action of a screw 109 threaded into a tab adjacent one of the arms 102 and extending through the end bell in journalling relationship. The outer end of this screw has a crank 110, or other means, for regulating the position of the ring relative to the stator.

In all of the forms of the invention, when the ring structure is close to the stator, a portion of the flux set up by the winding 19 moves therethrough rather than through the rotor 21, the relative amounts of flux being, of course, determined by the relative reluctances of the two paths. When this ring structure is close to the stator structure, the reactance of the winding 19 is increased, due to the decrease in reluctance of the flux path, and the starting current passing through this winding 19 is thus limited. As the rotor comes up to speed and as the ring structure moves away from the stator, the reluctance of the short-circuiting path increases to a value greater than the reluctance of the normal path through the rotor, thus allowing a normal flux to circulate through the rotor in the usual manner.

Similarly, it is possible to use the ring structure of my invention for the purpose of controlling the speed of such an induction motor. In this connection it will be understood that short-circuiting a portion of the flux which would otherwise pass through the rotor decreases the amount of flux passing through the rotor and thus tends to decrease the speed of this rotor. The combination shown in Fig. 10 is particularly applicable to such a system of changing the speed of an induction motor, inasmuch as a rotation of the crank 110 will vary the position of the ring structure relative to the stator and will thus vary the speed of the motor.

While I have particularly described several forms of the invention, it should be understood that these forms are only diagrammatically shown, and that in actual practice slight changes in design are generally desirable. It should thus be understood that I am not limited to the particular forms shown but only by the appended claims taken with the whole of this disclosure. Nor am I limited to the use of my invention on induction motors for it is useful in any dynamo-electric system wherein variable amounts of flux are to be short-circuited. Such conditions are met in certain types of generators, as well as in other types of motors.

I claim as my invention:

1. In a dynamo-electric machine, the combination of: a stationary member; a movable member; a primary winding on one of said members for sending flux through the other of said members; a winding on the other of said members and in which said flux induces a voltage; and an expansible magnetic body movable relative to both of said members and from a position close to said one of said members to a position a distance from said one of said members for short-circuiting a portion of the flux produced by said primary winding, which portion of said flux would otherwise pass through said secondary winding.

2. In an electric motor, the combination of: a stator including a rotor space; a winding on said stator for sending flux into said rotor space; a rotor rotatably mounted in said rotor space and through which a major portion of said flux passes; a plurality of segments formed of magnetic material and positioned in said rotor space; and means for pivoting said segments about axes spaced from the axis of rotation of said rotor so that they may move toward and away from said stator to short-circuit variable amounts of said flux.

3. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space but is substantially immovable in an axial direction; a member extending into said control space and movable from an advanced position close to said magnetic body of said stator into a retracted position more removed from said magnetic body in a manner to short-circuit varying amounts of said flux which would otherwise flow through said rotor; and control means operatively connected to said member to move same from said advanced position toward said retracted position as said rotor comes up to speed and holding said member away from its advanced position while said rotor is operating at normal speed.

4. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space; and means extending into said control space and movable from an advanced position close to said magnetic body of said stator into a retracted position more removed from said magnetic body in a manner to short-circuit varying amounts of said flux which would otherwise flow through said rotor, said last-named means including a plurality of magnetic segments forming a variable-diameter ring of magnetic material.

5. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space; a plurality of magnetic segments positioned in said control space in overlapping relationship with respect to each other and movable outward and inward with respect to the wall of said control space to short-circuit varying amounts of said flux which would otherwise flow through said rotor; and stop means for determining the maximum positions of said segments.

6. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space; a plurality of magnetic segments positioned in said control space, each magnetic segment being of greater peripheral length than the peripheral distance between the poles formed by said stator winding at a particular instant when said stator winding is energized by an alternating current; and means for movably mounting said segments to move toward and away from the periphery of said control space to short-circuit varying amounts of said flux which would otherwise flow through said rotor.

7. A combination as defined in claim 3 in which said last-named means comprises a ring structure formed of magnetic material which when in said advanced position lies closer to the wall of said rotor space of said stator than does said rotor, thereby forming a low-reluctance path for said flux, and when in said more removed position is spaced from said magnetic body a distance greater than the distance between said rotor and said wall of said rotor space.

8. In a line-start induction motor, the combination of: a stator including a magnetic body, there being a rotor space in said magnetic body; a winding on said stator and adapted when energized to send flux through said magnetic body; a rotor in said rotor space; means for rotatably mounting said rotor in said space but preventing any substantial axial movement thereof; a ring structure formed of magnetic material and positioned concentric with the axis of rotation of said rotor; means movably mounting said ring structure to move toward and away from said magnetic body of said stator to short-circuit varying amounts of said flux which would otherwise pass through said rotor; and means for moving said ring structure away from said magnetic body after said rotor has been set into rotation by said flux, said ring structure being close to said magnetic body when said stator winding is first energized, thereby short-circuiting a large amount of said flux which would otherwise move through said rotor.

9. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space but is substantially immovable in an axial direction; a ring structure formed of magnetic material and extending into said control space; and control means for moving said ring structure away from said rotor as said rotor comes up to speed and in a direction parallel to the axis of rotation of said rotor to short-circuit varying amounts of said flux which would otherwise pass through said rotor, said last-named means including means for holding said ring structure away from its position adjacent said rotor while said rotor is turning at normal speed.

10. In combination: a stator including a magnetic body, there being a rotor space formed through said magnetic body; a winding on said stator and adapted when energized to send flux through said rotor space; a rotor in said rotor space but filling only a portion thereof to leave a control space in said rotor space at one end of said rotor; means for rotatably mounting said rotor so that it can rotate in said rotor space but is substantially immovable in an axial direction; a ring structure formed of magnetic material and extending into said control space; means for slidably mounting said ring structure to move same into said control space and from said control space to short-circuit varying amounts of said flux which would otherwise pass through said rotor; and means preventing rotation of said ring structure during its movement into and from said control space.

CARL E. JOHNSON.